United States Patent [19]

Miller

[11] Patent Number: 4,921,594

[45] Date of Patent: * May 1, 1990

[54] PRODUCTION OF LOW POUR POINT LUBRICATING OILS

[75] Inventor: Stephen J. Miller, San Francisco, Calif.

[73] Assignee: Chevron Research Company, San Francisco, Calif.

[*] Notice: The portion of the term of this patent subsequent to Aug. 25, 2004 has been disclaimed.

[21] Appl. No.: 86,118

[22] Filed: Aug. 17, 1987

Related U.S. Application Data

[63] Continuation-in-part of Ser. No. 70,492, Jul. 6, 1987, which is a continuation of Ser. No. 750,388, Jun. 20, 1985, abandoned.

[51] Int. Cl.$^5$ ............................................. C10G 47/16
[52] U.S. Cl. ....................................... 208/58; 208/111
[58] Field of Search ................. 208/111, 120, 89, 57, 208/58; 502/214

[56] References Cited

U.S. PATENT DOCUMENTS

| | | | |
|---|---|---|---|
| 4,283,271 | 8/1981 | Garwood et al. | 208/59 |
| 4,440,871 | 4/1984 | Lok et al. | 208/136 X |
| 4,518,485 | 5/1985 | La Pierre et al. | 208/89 |
| 4,574,043 | 3/1986 | Chester et al. | 208/59 |
| 4,683,050 | 7/1987 | Ward | 208/111 X |
| 4,686,009 | 8/1987 | Pellet et al. | 208/111 |
| 4,689,138 | 8/1987 | Miller | 208/111 |

Primary Examiner—Glenn Caldarola
Attorney, Agent, or Firm—T. G. De Jonghe; V. J. Cavalieri

[57] ABSTRACT

Lubricating oils are prepared by a process whereby a hydrocarbonaceous feedstock is hydrocracked and subsequently dewaxed over a crystalline silicoaluminophosphate SAPO-11 containing platinum and/or palladium.

7 Claims, 4 Drawing Sheets

PRODUCTION OF LOW POUR POINT LUBRICATING OILS

This is a continuation-in-part of application Ser. No. 70,492, filed July 6, 1987, which is a continuation of application Ser. No. 750,388, filed June 28, 1985, now abandoned.

BACKGROUND OF THE INVENTION

This invention relates to a process for preparation of lubricating oil stocks. In particular, it relates to a specific combination of unit processes whereby a hydrocarbonaceous feedstock is hydrocracked and subsequently dewaxed using a specific crystalline silicoaluminophosphate catalyst. The lube oil stocks so produced have a relatively low pour point, and excellent viscosity and viscosity index (VI) properties.

High-quality lubricating oils are critical for the machinery of modern society. Unfortunately, the supply of natural crude oils having good lubricating properties, e.g., Pennsylvania and Arabian Light feedstocks, is not enough to meet the demand. Additionally, because of uncertainties in world crude oil supplies, it is necessary to be able to produce high-quality lubricating oils efficiently from ordinary crude feedstocks.

Numerous processes have been proposed to produce lubricating oils by upgrading the ordinary and low-quality stocks which ordinarily would be converted into other products.

The desirability of upgrading a crude fraction normally considered unsuitable for lubricant manufacture into one from which good yields of lubes can be obtained has long been recognized. Hydrocracking processes have been proposed to accomplish such upgrading. U.S. Pat. Nos. 3,506,565, 3,637,483 and 3,790,472 teach hydrocracking processes for producing lubricating oils.

Hydrocracked lubricating oils generally have an unacceptably high pour point and require dewaxing. Solvent dewaxing is a well-known and effective process but expensive. More recently, catalytic methods for dewaxing have been proposed. U.S. Pat. No. Re. 28,398 discloses dewaxing petroleum charge stocks using ZSM-5 type zeolites. U.S. Pat. No. 3,755,145 discloses a process for preparing low pour point lube oils by hydrocracking a lube oil stock using a catalyst mixture comprising a conventional cracking catalyst and ZSM-5.

It has also been suggested that in order to improve the oxidation resistance of lubricants it is often necessary to hydrogenate or hydrofinish the oil after hydrocracking, with and without catalytic dewaxing as illustrated in U.S. Pat. Nos. 4,325,805; 4,347,121; 4,162,962; 3,530,061; and 3,852,207. U.S. Pat. Nos. 4,283,272 and 4,414,097 teach continuous processes for producing dewaxed lubricating oil base stocks including hydrocracking a hydrocarbon feedstock, catalytically dewaxing the hydrocrackate and hydrofinishing the dewaxed hydrocrackate. These patents teach the use of catalysts comprising zeolite ZSM-5 and ZSM-23 respectively for the dewaxing phase.

All the foregoing patents indicate the state of the hydrocracking, dewaxing and stabilization art and are incorporated herein by reference as background.

A problem with the prior art processes for producing high-quality lubricating oils is the fact that the dewaxing processes used therein, such as when using dewaxing catalyst ZSM-5, function by means of cracking reactions, and therefore a number of useful products become degraded to lower molecular weight materials. For example, waxy paraffins may be cracked down to butane, propane, ethane and methane and so may the lighter n-paraffins which do not, in any event, contribute to the waxy nature of the oil. Because these lighter products are generally of lower value than the higher molecular weight materials, it would obviously be desirable to limit the degree of cracking which takes place during the catalytic dewaxing process. Also, the products obtained by the process of this invention have better viscosities and viscosity indexes at a given pour point as compared to the prior art processes using alumino-silicate zeolites such as ZSM-5.

SUMMARY OF THE INVENTION

In accordance with the present invention, there has been discovered a process for preparing lubricating oils which comprises (a) hydrocracking in a hydrocracking zone a hydrocarbonaceous feedstock to obtain an effluent comprising a hydrocracked oil; and (b) catalytically dewaxing in a catalytic dewaxing zone the hydrocracked oil of step (a) with a catalyst comprising a crystalline silicoaluminophosphate SAPO-11 and a metal selected from platinum or palladium.

Another embodiment of this invention includes an additional step of stabilizing said dewaxed hydrocrackate by catalytic hydrofinishing.

It has been discovered that the above combination of processing steps produces a high-quality lubricating oil from straight run crude oils as well as from low quality hydrocarbonaceous feeds. The first step is hydrocracking which increases the viscosity index of the feedstock by cracking and hydrogenating the aromatic compounds present in the feed. Hydrocracking also reduces the nitrogen content of the feed to a very low level. After the hydrocracking, a catalytic dewaxing step using crystalline silicoaluminophosphate SAPO-11 containing platinum or palladium or combinations thereof takes place. Combining the first hydrocracking step with the second catalytic dewaxing step makes the dewaxing process extremely efficient since the activity of the dewaxing catalyst appears to increase as the nitrogen level decreases.

The crystalline silicoaluminophosphate SAPO-11 catalyst gives improved lube yield and VI because it reduces pour point by a different mechanism than conventional dewaxing catalyst such as ZSM-5. The crystalline silicoaluminophosphate dewaxing catalyst is shape selective in that it appears to isomerize normal and slightly branched chain paraffins and cycloparaffins without much cracking of highly branched paraffins. While the n-paraffins, slightly branched paraffins and cycloparaffins undergo some cracking or hydrocracking, the degree of cracking which occurs is, however, limited so that the gas yield is reduced thereby preserving the economic value of the feedstock. Many of the prior art catalysts crack both the highly branched as well as the normal paraffins to lighter products and gases. Because these lighter products are generally of lower value than the higher molecular weight materials, it would obviously be desirable to limit the degree of cracking which takes place during the process.

According to a preferred embodiment of the present invention, the first step of the process, hydrocracking, is carried out to reduce the nitrogen content of the feed to less than 50, preferably less than 10, and most preferably less than about 1 ppmw. Especially good results, in terms of activity and length of catalyst cycle (period between successive regenerations or start-up and first regeneration), are experienced when the feed contains these lower levels of organic nitrogen.

Among other factors, the present invention is based on the discovery that improved lubricating oil yields may be obtained by a process comprising hydrocracking followed by dewaxing using a catalyst comprising SAPO-11 and platinum or palladium.

The main purpose of the hydrocracking step is to upgrade VI whereas the main purpose of the dewaxing step is to reduce pour point. With prior art processes, the hydrocracker must upgrade VI more than necessary to meet final product specifications. This is because conventional dewaxing catalysts, such as ZSM-5, reduce VI during dewaxing However, SAPO-11 in combination with platinum or palladium, gives improved VI for any given hydrocracker product, i.e., it does not reduce VI of the hydrocrackate as much as the conventional dewaxing catalysts. Thus, with SAPO-11, the hydrocracking step can be operated at lower severity (less conversion) to produce a dewaxer feed of lower VI relative to conventional processing, since subsequent VI loss in the dewaxer will be less than with conventional catalysts. The lower severity for the hydrocracking step improves the lube yield from that step. The improvements in this invention comes not only from increased lube yield after dewaxing but also from increased lube yield after hydrocracking.

DETAILED DESCRIPTION

The hydrocarbonaceous feeds from which lube oils are made usually contain aromatic compounds as well as normal and branched paraffins of very long chain lengths. These feeds usually boil in the gas oil range. Preferred feedstocks are vacuum gas oils with normal boiling ranges in the range of 350° C. to 600° C., and deasphalted residual oils having normal boiling ranges from about 480° C. to 650° C. Reduced topped crude oils, shale oils, liquified coal, coke distillates, flask or thermally cracked oils, atmospheric residua, and other heavy oils can also be used.

The first step in the processing scheme is hydrocracking. In commercial operations, hydrocracking can take place as a single step process, or as a multi-step process using initial denitrification or desulfurization steps, all of which are well known.

Typically, hydrocracking process conditions include temperatures in the range of 250° C. to 500° C., pressures in the range of about 425 to 3000 psig, or more, a hydrogen recycle rate of 400 to 15,000 SCF/bbl, and a LHSV (v/v/hr) of 0.1 to 50.

During the hydrocracking step there are conversions of at least 10% to products boiling below 350° C. Catalysts employed in the hydrocracking zone or zones include those having hydrogenation-dehydrogenation activity, and active cracking supports. The support is often a refractory inorganic oxide such as silica-alumina, silica-alumina-zirconia and silica-alumina-titania composites, acid-treated clays, crystalline aluminosilicate zeolitic molecular sieves (such as Zeolite A, faujasite, Zeolite X and Zeolite Y), and combinations of the above.

Hydrogenation-dehydrogenation components of the hydrocracking catalyst usually comprise metals selected from Group VIII and Group VIB of the Periodic Table, and compounds including them. Preferred Group VIII components include cobalt, nickel, platinum and palladium, particularly the oxides and sulfides of cobalt and nickel. Preferred Group VIB components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina.

A particularly preferred hydrocracking catalyst for use in the present process is nickel sulfide/tungsten sulfide on a silica-alumina base which contains discrete metal phosphate particles (described in U.S. Pat. No. 3,493,517, incorporated herein by reference).

Hydrocracking catalysts can vary in their activities for hydrogenation and cracking and in their ability to sustain high activity during long periods of use depending upon their compositions and methods of preparation. There are any number of catalysts which are known to the art and which can be selected for use in the hydrocracking step based on operating conditions and feeds to optimize the hydrocracking operation.

The hydrocracking process step is performed to yield a hydrocrackate having a total nitrogen content preferably of less than about 50 ppm (w/w). Standard hydrocracking procedures can easily achieve this nitrogen level, especially where the feed is subject to an initial partial denitrification process. Preferably, the nitrogen content of the hydrocrackate is as low as is consistent with economical refinery operations, but is preferably less than 10 ppm and more preferably less than about 1 ppm (w/w).

The hydrocracking step yields two significant benefits. First, by lowering the nitrogen content, it dramatically increases the efficiency and ease of the catalytic dewaxing step. Second, the viscosity index is greatly increased as the aromatic compounds present in the feed, especially the polycyclic aromatics, are opened and hydrogenated. In the hydrocracking step, increases of at least 10 VI units will occur in the lube oil fraction, i.e., that fraction boiling above 230° C. and more preferably above 315° C.

The hydrocrackate is preferably distilled by conventional means to remove those products boiling below 230° C., and more preferably below 315° C. to yield one or more lube oil boiling range streams. Depending upon the particular lube oil desired, for example a light, medium, or heavy lube oil, the raw hydrocrackate may be fractionably distilled into light, medium or heavy oil fractions. Among the lower boiling products removed are light nitrogen containing compounds such as NH₃. This yields a lube oil stream with a reduced nitrogen level, so that the crystalline silicoaluminophosphate SAPO-11 in the dewaxing catalyst achieves maximum activity in the dewaxing step. Lubricating oils of different boiling ranges can be prepared by the process of this invention. These would include light neutral, medium neutral, heavy neutral and bright stock, where the neutral oils are prepared from distillate fractions and bright stock from residual fractions.

The great efficiency of the present invention comes in part from the combination of hydrocracking to produce a very low nitrogen, high viscosity index stock which is then extremely efficiently dewaxed to achieve a very low pour point and improved viscosity and viscosity index. It can be appreciated that the higher the activity of the dewaxing catalyst, the lower the reactor temperature necessary to achieve a particular degree of dewaxing. A significant benefit is, therefore, the greater energy savings from using the enhanced efficiency catalyst and usually longer cycle life. Additionally, since the crystalline silicoaluminophosphate SAPO-11 dewaxing catalyst is shape-selective it reacts preferentially with the waxy components of the feedstock responsible for high pour points, i.e., the normal paraffins as well as the slightly branched paraffins and alkyl substituted cycloparaffins which comprise the so-called microcrystalline wax.

As mentioned above, the process combines elements of hydrocracking and dewaxing. The catalyst used in the dewaxing step of the process has an acidic component, and a platinum and/or palladium hydrogenation component. The acidic component comprises a SAPO-11 crystalline silicoaluminophosphate, which is described in U.S. Pat. No. 4,440,871 and reference is made to this patent for details of this molecular sieve and its preparation, which patent is incorporated totally herein by reference.

The SAPO-11 silicoaluminophosphate molecular sieve (SAPO) suitable for use in the instant process comprises a molecular framework of corner-sharing [SiO₂] tetrahedra, [AlO₂] tetrahedra and [PO₂] tetrahedra, [i.e., (Si$_x$Al$_y$P$_z$)O₂ tetrahedral units], and which functions when combined with a platinum or palladium hydrogenation component to convert at effective process conditions the waxy components to produce a lubricating oil having excellent yield, pour point, viscosity and viscosity index.

Figure 1:
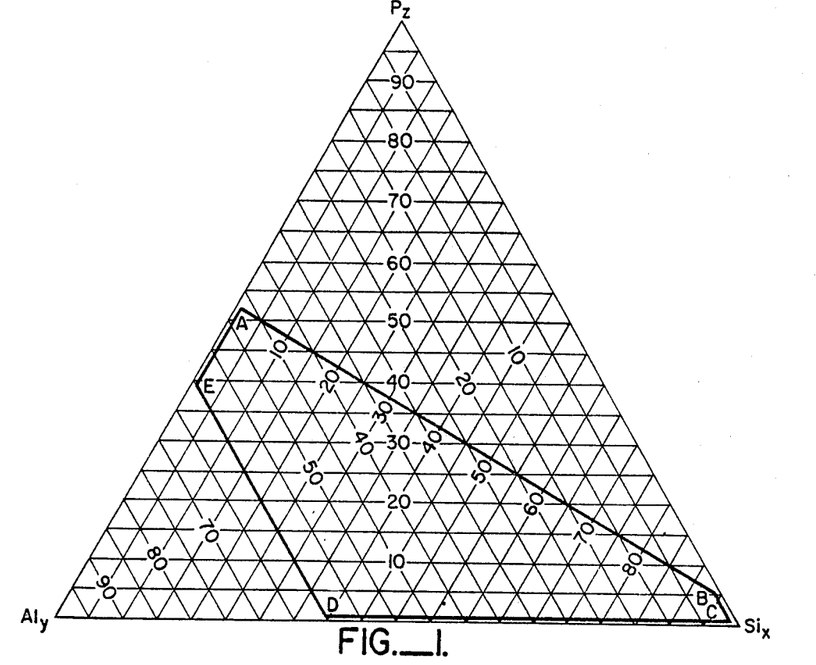
FIG. 1 is a ternary diagram showing the compositional parameters of the silicoaluminophosphates of U.S. Pat. No. 4,440,871 in terms of mole fractions of silicon, aluminum and phosphorus.
Figure 2:
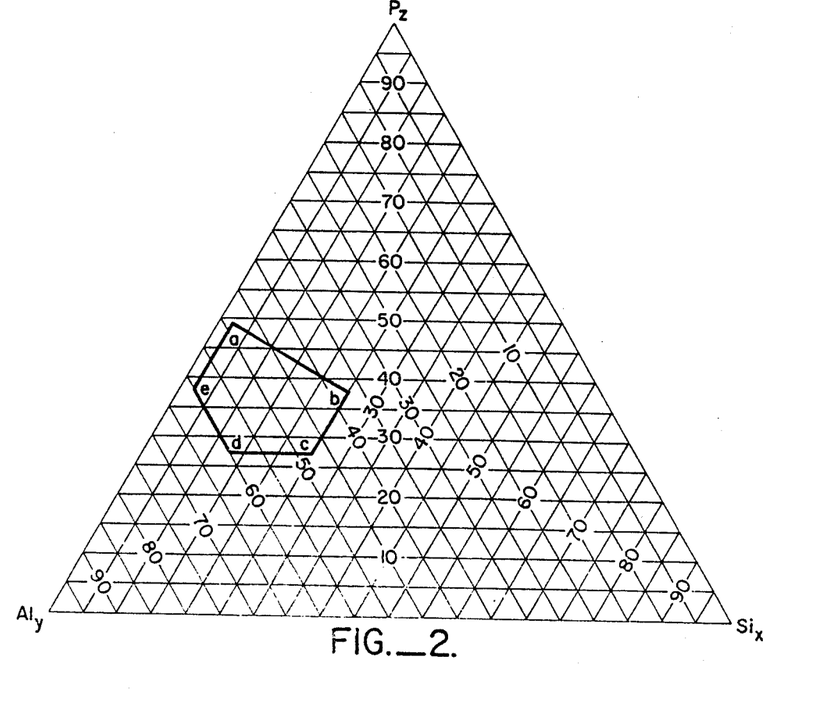
FIG. 2 is a ternary diagram showing the preferred compositional parameters of the silicoaluminophosphates of mole fractions of silicon, aluminum and phosphorus.

More specifically, SAPO-11, as referred to herein, comprises a silicoaluminophosphate material having a three-dimensional microporous crystal framework structure of [PO₂], "AlO₂] and [SiO₂] tetrahedral units whose unit empirical formula on an anhydrous basis is:

$$mR:(Si_xAl_yP_z)O_2 \qquad (1)$$

wherein "R" represents at least one organic templating agent present in the intracrystalline pore system; "m" represents the moles of "R" present per mole of (Si$_x$Al$_y$P$_z$)O₂ and has a value from zero to about 0.3, "x", "y" and "z" represent respectively, the mole fractions of silicon, aluminum and phosphorus, said mole fractions being within the compositional area bounded by points A, B, C, D and E on the ternary diagram which is FIG. 1 or preferably within the area bounded by points a, b, c, d and e on the ternary diagram which is FIG. 2, and said silicoaluminophosphate having a characteristic X-ray powder diffraction pattern which contains at least the d-spacings (as-synthesized and calcined) set forth below in Table I. When SAPO-11 is in the as-synthesized form "m" preferably has a value of from 0.02 to 0.3.

TABLE I

| 2θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

All of the as-synthesized SAPO-11 compositions for which X-ray powder diffraction data have been obtained to date have patterns which are within the generalized pattern of the Table II below.

TABLE II

| 2θ | | d | 100 × I/I$_o$ |
|---|---|---|---|
| 8.05–8.3 | | 10.98–10.65 | 20–42 |
| 9.4–9.65 | | 9.41–9.17 | 36–58 |
| 13.1–13.4 | | 6.76–6.61 | 12–16 |
| 15.6–15.85 | | 5.68–5.59 | 23–38 |
| 16.2–16.4 | | 5.47–5.40 | 3–5 |
| 18.95–19.2 | | 4.68–4.62 | 5–6 |
| 20.3–20.6 | | 4.37–4.31 | 36–49 |
| 21.0–21.3 | | 4.23–4.17 | 100 |
| 22.1–22.35 | | 4.02–3.99 | 47–59 |
| 22.5–22.9 | (doublet) | 3.95–3.92 | 55–60 |
| 23.15–23.35 | | 3.84–3.81 | 64–74 |
| 24.5–24.9 | (doublet) | 3.63–3.58 | 7–10 |
| 26.4–26.8 | (doublet) | 3.38–3.33 | 11–19 |
| 27.2–27.3 | | 3.28–3.27 | 0–1 |
| 28.3–28.5 | (shoulder) | 3.15–3.13 | 11–17 |
| 28.6–28.85 | | 3.121–3.094 | |
| 29.0–29.2 | | 3.079–3.058 | 0–3 |
| 29.45–29.65 | | 3.033–3.013 | 5–7 |
| 31.45–31.7 | | 2.846–2.823 | 7–9 |
| 32.8–33.1 | | 2.730–2.706 | 11–14 |
| 34.1–34.4 | | 2.629–2.607 | 7–9 |
| 35.7–36.0 | | 2.515–2.495 | 0–3 |
| 36.3–36.7 | | 2.475–2.449 | 3–4 |
| 37.5–38.0 | (doublet) | 2.398–2.368 | 10–13 |
| 39.3–39.55 | | 2.292–2.279 | 2–3 |
| 40.3 | | 2.238 | 0–2 |
| 42.2–42.4 | | 2.141–2.132 | 0–2 |
| 42.8–43.1 | | 2.113–2.099 | 3–6 |
| 44.8–45.2 | (doublet) | 2.023–2.006 | 3–5 |
| 45.9–46.1 | | 1.977–1.969 | 0–2 |
| 46.8–47.1 | | 1.941–1.929 | 0–1 |
| 48.7–49.0 | | 1.870–1.859 | 2–3 |
| 50.5–50.8 | | 1.807–1.797 | 3–4 |
| 54.6–54.8 | | 1.681–1.675 | 2–3 |
| 55.4–55.7 | | 1.658–1.650 | 0–2 |

When used in the present process, the silico-aluminophosphate is employed in admixture with at least one of the noble metals platinum, palladium and optionally other catalytically active metals such as molybdenum, nickel, vanadium, cobalt, tungsten, zinc., etc., and mixtures thereof. The amount of metal ranges from about 0.01% to 10% and preferably 0.2 to 5% by weight of the molecular sieve. The techniques of introducing catalytically active metals to a molecular sieve are disclosed in the literature, and preexisting metal incorporation techniques and treatment of the molecular sieve to form an active catalyst are suitable, e.g., ion exchange, impregnation or by occlusion during sieve preparation. See, for example, U.S. Pat. Nos. 3,236,761, 3,226,339, 3,236,762, 3,620,960, 3,373,109, 4,202,996 and 4,440,871 which patents are incorporated totally herein by reference.

The metal utilized in the process of this invention can mean one or more of the metals in its elemental state or in some form such as the sulfide or oxide and mixtures thereof. As is customary in the art of catalysis, when referring to the active metal or metals it is intended to encompass the existence of such metal in the elementary state or in some form such as the oxide or sulfide as mentioned above, and regardless of the state in which the metallic component actually exists the concentrations are computed as if they existed in the elemental state.

The physical form of the silicoaluminophosphate catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

The catalytic dewaxing step of this invention may be conducted by contacting the feed to be dewaxed with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen. The dewaxing step may be carried out in the same reactor as the hydrocracking step but is preferably carried out in a separate reactor. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1,000 to about 20,000 SCF/bbl. Generally, hydrogen will be separated from the product and recycled to the reaction zone.

The crystalline silicoaluminophosphate catalyst used in the dewaxing step provides selective conversion of the waxy components to non-waxy components. During processing the waxy paraffins undergo mild cracking reactions to yield non-waxy products of higher molecular weight than compared to products obtained using the prior art zeolite catalyst. At the same time, a measure of isomerization takes place so that not only is the pour point reduced by reason of the cracking reactions described above, but in addition the waxy components become isomerized to form liquid range materials which contribute to a low viscosity, low pour point product having excellent VI properties.

Because of the selectivity of the crystalline silicoaluminophosphate catalyst used in the dewaxing step of this invention, the gas yield is reduced, thereby preserving the economic value of the feedstock.

Hydrogen consumption during the dewaxing step of this invention is less compared to prior art processes using conventional dewaxing catalysts because isomerization does not consume hydrogen and cracking to liquid range products consumes less hydrogen than cracking to gas.

The silicoaluminophosphate molecular sieve catalyst can be manufactured into a wide variety of physical forms. Generally speaking, the molecular sieves can be in the form of a powder, a granule, or a molded product, such as extrudate having a particle size sufficient to pass through a 2-mesh (Tyler) screen and be retained on a 40-mesh (Tyler) screen. In cases where the catalyst is molded, such as by extrusion with a binder, the silicoaluminophosphate can be extruded before drying, or, dried or partially dried and then extruded.

The molecular sieve can be composited with other material resistant to the temperatures and other conditions employed in the dewaxing process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the dewaxing process so that products can be obtained economically without employing other means for controlling the rate of reaction. The silicoaluminophosphate may be incorporated into naturally occurring clays, e.g., betonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the silicoaluminophosphate include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the silicoaluminophosphate can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumino-thoria, silica-alumina-titania, silica-alumina-magnesia and silica-magnesia-zirconia. The matrix can be in the form of a cogel.

The silicoaluminophosphate catalyst used in the process of this invention can also be composited with other zeolites such as synthetic and natural faujasites, (e.g., X and Y) erionites, and mordenites. It can also be composited with purely synthetic zeolites such as those of the ZSM series. The combination of zeolites can also be composited in a porous inorganic matrix.

It is often desirable to use mild hydrogenation (sometimes referred to as hydrofinishing) to produce more stable lubricating oils.

The hydrofinishing step can be performed either before or after the dewaxing step, and preferably after. Hydrofinishing is typically conducted at temperatures ranging from about 190° C. to about 340° C. at pressures from about 400 psig to about 3000 psig at space velocities (LHSV) between about 0.1 and 20 and a hydrogen recycle rates of 400 to 1500 SCF/bbl. The hydrogenation catalyst employed must be active enough not only to hydrogenate the olefins, diolefins and color bodies within the lube oil fractions, but also to reduce the aromatic content. The hydrofinishing step is beneficial in preparing an acceptably stable lubricating oil since lubricant oils prepared from hydrocracked stocks tend to be unstable to air and light and tend to form sludges spontaneously and quickly.

Suitable hydrogenation catalysts include conventional metallic hydrogenation catalysts, particularly the Group VIII metals such as cobalt, nickel, palladium and platinum. The metal is typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are detailed, for instance, in U.S. Pat. Nos. 3,852,207; 4,157,294; 3,904,513 and 4,673,487, all of which are incorporated herein by reference.

The improved process of this invention will now be illustrated by examples which are not to be construed as limiting the invention as described in this specification including the attached claims.

EXAMPLES

Example 1

SAPO-11 was grown according to U.S. Pat. No. 4,440,871 and identified as such by X-ray diffraction analysis. Elemental analysis of the calcined sieve showed it to have the following anhydrous molar composition:

$$0.16 SiO_2:Al_2O_3:P_2O_5$$

The seive was bound with 35% Catapal alumina and made into 1/16-inch extrudate. The extrudate was dried four hours at 250° F., calcined in air for four hours at 895° F., then impregnated with 1 weight percent Pt (as $Pt(NH_3)_4Cl_2.H_2O$) by the pore-fill method. It was then dried overnight at 275° F. and calcined in air for eight hours at 850° F.

Example 2

A 700°–1000° F. crude distillate (Table III) was hydrocracked at 770°–777° F., 0.60 LHSV, 2200 psig, and 6200 SCF/bbl $H_2$ over a layered catalyst system of 33/62/5 LV % Catalysts A/B/C, described below.

Catalyst A was a cogelled catalyst containing about 9% NiO, 21% $WO_3$, 8% $TiO_2$, and 17% ultrastable Y zeolite in a silica-alumina matrix having an $SiO_2/Al_2O_3$ weight ratio of 1. Catalyst B was the same as Catalyst A but contained no zeolite. Both catalysts had about 220 ppm Na. Catalysts of this type can be prepared for example by the method of U.S. Pat. No. 3,401,125. Catalyst C was an impregnated catalyst of about 5% NiO and 18% $MoO_3$ on alumina.

The hydrocracked product was fractionated by distillation to produce a predominatly 700°–800° F. cut (Table IV) and an 800° F.+ bottoms (Table V).

TABLE III

| 700–1000° F. Feed | |
|---|---|
| Gravity, °API | 19.6 |
| Aniline Point, °F. | 168.9 |
| Sulfur, Wt. % | 1.07 |
| Nitrogen, Wt. % | 0.22 |
| Pour Point, °F. | +90 |
| Viscosity, cS, 100° C. | 9.151 |
| P/N/A/S, LV % | 10.5/36.6/44.5/3.3 |
| Simulated Distillation, LV %, °F. | |
| ST/5 | 606/698 |
| 10/30 | 728/787 |
| 50 | 828 |
| 70/90 | 875/955 |
| 95/EP | 992/1062 |

TABLE IV

| +75° F. Pour Point Lube Oil | |
|---|---|
| Gravity, °API | 33.9 |
| Aniline Point, °F. | 216.6 |
| Sulfur, ppm | 1.3 |
| Nitrogen, ppm | 0.3 |
| Pour Point, °F. | +75 |
| Viscosity, cS, 100° C. | 3.610 |
| P/N/A/S, LV % | 27.6/61.6/10.8/0 |
| Simulated Distillation, LV %, °F. | |
| ST/5 | 347/641 |
| 10/30 | 671/725 |
| 50  | 759 |
| 70/90 | 788/824 |
| 95/EP | 839/866 |

TABLE V

| +100° F., Pour Point Lube Oil | |
|---|---|
| Gravity, °API | 34.0 |
| Aniline Point, °F. | 244.0 |
| Sulfur, ppm | 0.4 |
| Nitrogen, ppm | 0.1 |
| Pour Point, °F. | +100 |
| Viscosity, cS, 100° C. | 6.195 |
| Flash Point, °F. | 420 |
| P/N/A/S, LV % | 25.0/62.1/12.8/0 |
| Simulated Distillation, LV %, °F. | |
| ST/5 | 313/770 |
| 10/30 | 794/841 |
| 50 | 873 |
| 70/90 | 908/968 |
| 95/EP | 998/1061 |

Example 3

Figure 3:
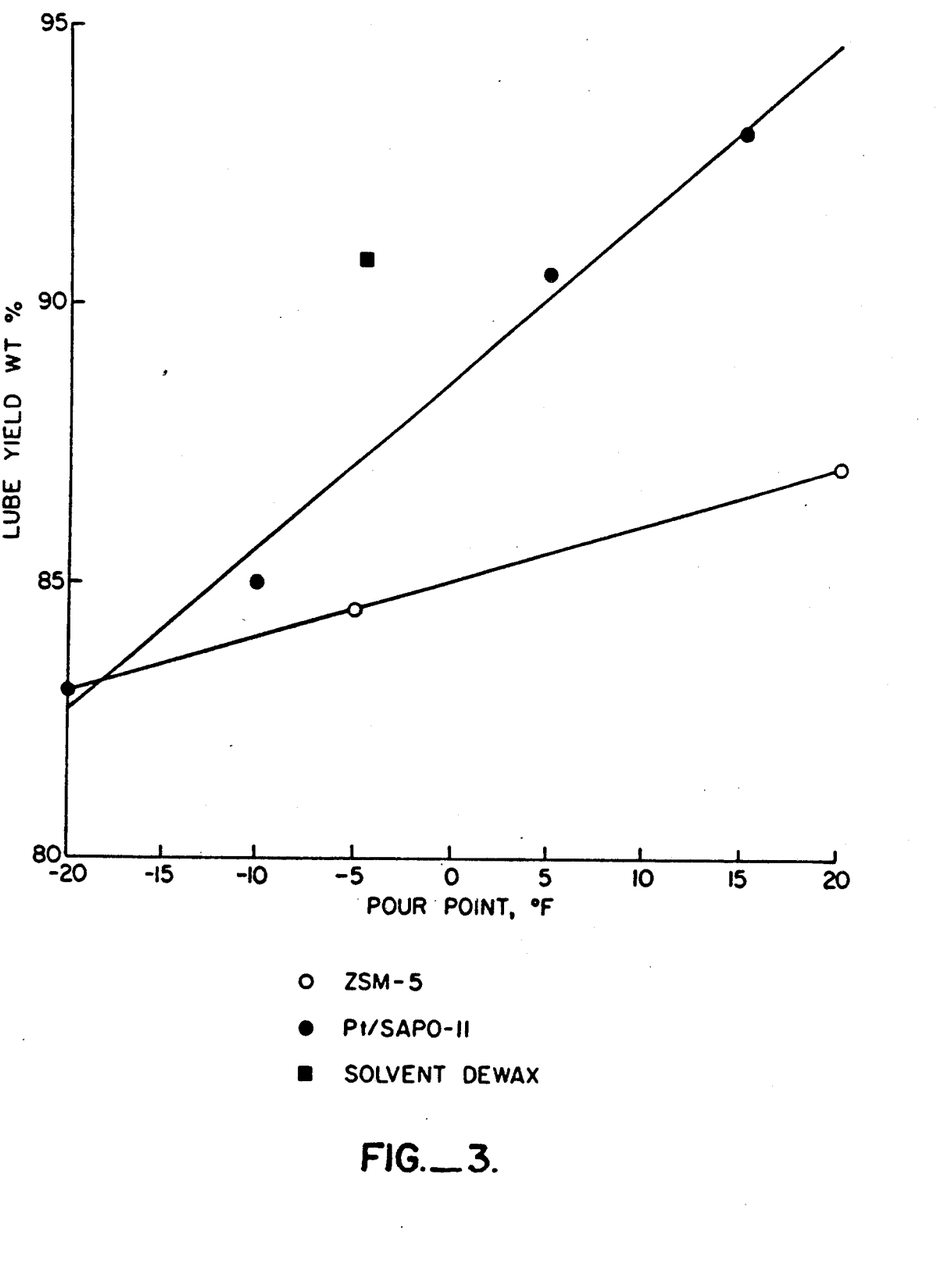
FIG. 3 is a graph showing a comparison for a crystalline silicoaluminophosphate SAPO-11 catalyst used in the dewaxing step of the process of this invention and a ZSM-5 catalyst with respect to lube yield at a given pour point.

The Pt/SAPO-11 catalyst of Example 1 was tested for dewaxing a +75° F. pour lube oil (inspections given in Table IV) at 1 LHSV, 2200 psig, and 8M SCF/bbl once-through $H_2$. The pour point could be lowered to +15° F. at a catalyst temperature of 640° F. Pour point reduction could be increased by raising the catalyst temperature. FIG. 3 compares the 700° F.+ lube yield for the catalyst of this invention with that for a conventional ZSM-5 catalyst containing 35% Catapal binder and run at the same space velocity, pressure, and $H_2$ rate. Here 700° F.+ lube yield is defined as:

$$1 - \frac{g\ 700°\ F.+\ (feed) - g\ 700°\ F.+\ (product)}{g\ 700°\ F.+\ (feed)} \times 100\%$$

Figure 4:
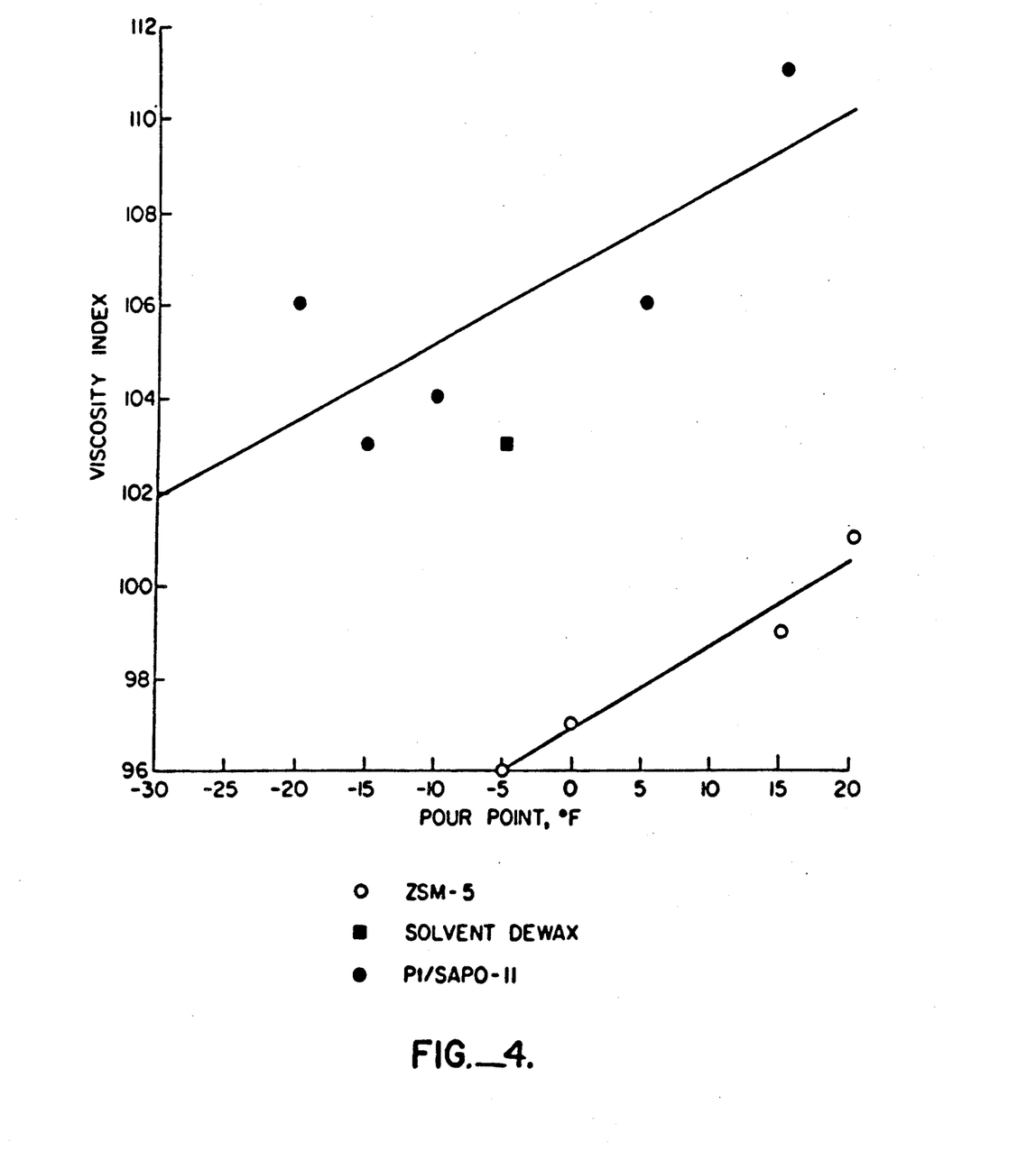
FIG. 4 is a graph showing a comparison for a crystalline silicoaluminophosphate catalyst SAPO-11 used in the dewaxing step of the process of this invention and a ZSM-5 catalyst with respect to viscosity index at a given pour point.
Figure 5:
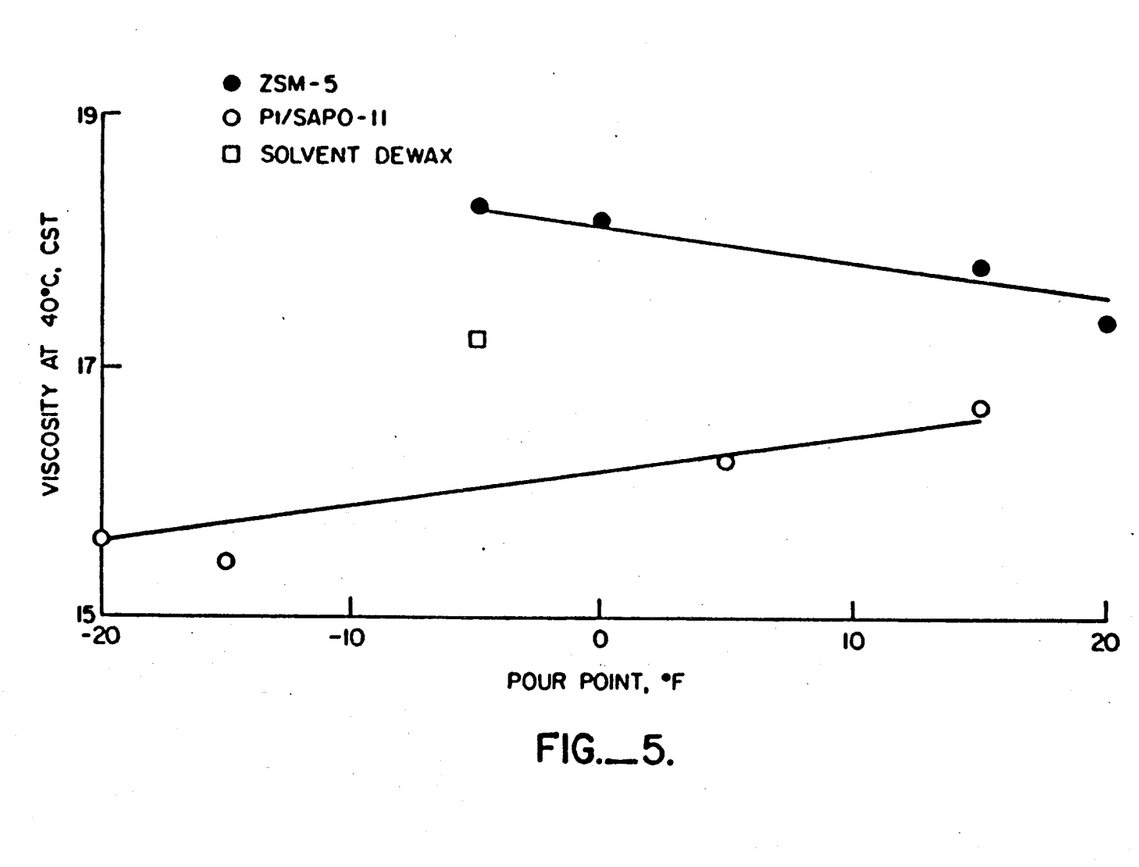
FIG. 5 is a graph showing a comparison for a crystalline silicoaluminophosphate catalyst SAPO-11 used in the dewaxing step of the process of this invention and a ZSM-5 catalyst with respect to viscosity index at a given pour point.

The figure shows a marked advantage in terms of greater yield for the SAPO-11 catalyst. A large viscosity index (VI) advantage was also found (FIG. 4) as was a lower viscosity (FIG. 5).

Example 4

The following catalysts were compared for dewaxing a +100° F. pour point lube oil (inspections given in Table V) at 1 LHSV, 2200 psig, and 8M SCF/bbl $H_2$.
(a) the Pt/SAPO-11 catalyst of Example 1
(b) the ZSM-5 catalyst of Example 3
(c) a ZSM-5 catalyst similar to that of Example 3 but impregnated with 0.8 wt. % Pt. Table VI shows advantages for the Pt/SAPO-11 in both yield and VI. It also shows this catalyst to produce much less $C_4-$ gas in the cracked product.

TABLE VI

| Catalyst | Pt/SAPO-11 | | | ZSM-5 | | Pt/ZSM-5 | |
|---|---|---|---|---|---|---|---|
| Catalyst Temperature, °F. | 690 | 725 | 750 | 650 | 670 | 580 | 610 |
| Pour Point, °F. | +30 | +15 | +5 | +30 | +5 | +30 | +5 |
| Viscosity, CS, 40° C. | 34.99 | 36.65 | 35.91 | 45.66 | 50.33 | 46.72 | 49.83 |
| Viscosity, CS, 100° C. | 6.234 | 6.372 | 6.272 | 7.124 | 7.491 | 7.235 | 7.419 |
| VI | 128 | 125 | 125 | 115 | 111 | 115 | 111 |
| 800° F.+ Lube Yield, Wt % | 79.0 | 77.5 | 68.0 | 77 | 69 | 78 | 71 |
| P/N/A, LV % | 29.3/65.3/5.4 | | | | | 14.3/78.8/6.9 | |
| P/N/A, ndM | 77.60/22.34/0.07 | | | | | 73.21/26.79/0.00 | |
| Simulated Distillation, LV %, °F. | | | | | | | |
| ST/5 | 718/769 | 731/775 | 723/770 | 731/784 | 739/788 | 631/767 | 717/779 |
| 10/30 | 793/842 | 796/841 | 791/838 | 806/850 | 808/851 | 792/841 | 801/876 |
| 50 | 875 | 874 | 872 | 881 | 882 | 874 | 896 |
| 70/90 | 909/967 | 909/968 | 906/965 | 914/971 | 915/974 | 909/969 | 918/973 |
| 95/EP | 995/1062 | 998/1064 | 995/1060 | 999/1067 | 1003/1064 | 999/1062 | 1003/1061 |
| Catalyst Temperature, °F. | 690 | 725 | 750 | 650 | 670 | 580 | 610 |
| Cracked Product Selectivity, Wt % | | | | | | | |
| $C_4-$ | 10.7 | | | | | 53.4 | |
| $C_5$-350° F. | 18.7 | | | | | 39.7 | |
| 350–550° F. | 25.7 | | | | | 6.9 | |
| 550–800° F. | 44.9 | | | | | 0 | |

Example 5

Another batch of SAPO-11 was prepared similarly to that of Example 1, except that the molar composition of the anhydrous sieve was:

$$0.4SiO_2:Al_2O_3:P_2O_5.$$

This sieve was bound with alumina and impregnated with 1 weight percent Pt as in Example 1.

Example 6

The catalyst of Example 5 was used to dewax the lube oil of Table IV. The results (Table VII) again show the advantage of Pt/SAPO-11 for obtaining high lube yield and VI, as well as low viscosity.

TABLE VII

| Dewaxing +75° F. Pour Point Lube Oil at 1 LHSV, 2200 psig, and 8M SCF/bbl $H_2$ | | | | |
|---|---|---|---|---|
| Catalyst | Pt/SAPO-11 (Example 5) | | ZSM-5 | |
| Catalyst Temperature, °F. | 650 | 675 | 606 | 621 |
| Pour Point, °F. | −10 | −10 | +20 | −5 |
| Viscosity, CS, 40° C. | 16.79 | 16.88 | 17.33 | 18.26 |
| Viscosity, CS, 100° C. | 3.689 | 3.693 | 3.729 | 3.812 |
| VI | 105 | 104 | 101 | 96 |

TABLE VII-continued

| Dewaxing +75° F. Pour Point Lube Oil at 1 LHSV, 2200 psig, and 8M SCF/bbl $H_2$ | | | | |
|---|---|---|---|---|
| Catalyst | Pt/SAPO-11 (Example 5) | | ZSM-5 | |
| 700° F.+ Lube Yield, Wt % | 91.0 | 87.0 | 87.0 | 84.5 |

Example 7

The catalyst of Example 5 was used to dewax the lube oil of Table V. The results are shown in Table VIII.

TABLE VIII

| Dewaxing +100° F. Pour Point Lube Oil at 1 LHSV, 2200 psig, and 8M SCF/bbl $H_2$ | | | | |
|---|---|---|---|---|
| Catalyst | Pt/SAPO-11 (Example 5) | | ZSM-5 | |
| Catalyst Temperature, °F. | 700 | 725 | 650 | 670 |
| Pour Point, °F. | +15 | +5 | +30 | +5 |
| Viscosity, CS, 40° C. | 36.94 | 34.54 | 45.66 | 50.33 |
| Viscosity, CS, 100° C. | 6.362 | 6.083 | 7.124 | 7.491 |
| VI | 123 | 124 | 115 | 111 |
| 800° F.+ Lube Yield, Wt % | 78 | 69 | 77 | 69 |

Example 8

Another crude distillate similar to that of Table III was hydrocracked as described in Example 2 above and the product distilled to produce the oil of Table IX.

TABLE IX

| +115° F. Pour Point Lube Oil | |
|---|---|
| Gravity, °API | 36.6 |
| Sulfur, ppm | 1.5 |
| Nitrogen, ppm | 0.2 |
| Pour Point, °F. | +115 |
| Viscosity, CS, 100° C. | 5.307 |
| Flash Point, °F. | 435 |
| P/N/A/S, LV % | 37.4/57.4/5.2/0 |
| Simulated Distillation, LV %, °F. | |
| ST/5 | 120/716 |

TABLE IX-continued

| +115° F. Pour Point Lube Oil | |
|---|---|
| 10/30 | 744/803 |
| 50 | 849 |
| 70/90 | 893/953 |
| 95/EP | 982/1035 |

Example 9

The Pt/SAPO-11 catalyst of Example 1 was used to dewax a +115° F. pour point lube oil (inspections given in Table IX) at 1 LHSV, 2200 psig, and 8M SCF/bbl $H_2$. Table X compares the results versus those with the same ZSM-5 catalyst described in Example 3, again showing a major advantage for the SAPO-11 catalyst.

TABLE X

Dewaxing +115° F. Pour Point Lube Oil at 1 LHSV, 2200 psig, and 8M SCF/bbl $H_2$

| Catalyst | Pt/SAPO-11 (Example 1) | | | ZSM-5 | |
|---|---|---|---|---|---|
| Catalyst Temperature, °F. | 700 | 725 | 750 | 683 | 713 |
| Pour Point, °F. | +50 | +25 | +10 | +5 | −20 |
| Viscosity, CS, 40° C. | 27.41 | 27.87 | 26.78 | 35.00 | 35.03 |
| Viscosity, CS, 100° C. | 5.520 | 5.513 | 5.348 | 6.032 | 5.939 |
| VI | 144 | 139 | 138 | 118 | 114 |
| 700° F. + Lube Yield, Wt. % | 86.5 | 79.3 | 65.0 | 55.4 | 48.0 |

Example 10

SAPO-11 was grown similar to that of Example 1 having the following anhydrous molar composition:

0.31 $SiO_2$:$Al_2O_3$:$P_2O_5$.

The sieve was bound with 35% Catapal alumina and made into 1/16-inch extrudate. The extrudate was dried four hours at 250° F. and calcined in air for eight hours at 1000° F. It was then co-impregnated by the pore-fill method with 1% Ni and 3% Mo (using an aqueous solution of Ni(NO$_3$)$_2$ and ammonium molybdate). It was dried overnight at 250° F. and calcined in air for eight hours at 1000° F.

Example 11

The catalyst of the previous Example 10 was used to dewax the 75° F. pour point lube oil of Table IV. It was first presulfided in 1% $H_2S$ in $H_2$ for 40 minutes at 600° F., then run at 1 LHSV, 2200 psig, and 8M SCF/bbl once-through $H_2$. Inspections on the whole liquid product are shown in Table XI.

TABLE XI

Dewaxing +75° F. Pour Point Lube Oil at 1 LHSV, 2200 psig, and 8M SCF/bbl $H_2$ Over Ni-Mo/SAPO-11

| | |
|---|---|
| Catalyst Temperature, °F. | 725 |
| Pour Point, °F. | +10 |
| Viscosity, cS, 40° C. | 13.85 |
| Viscosity, cS, 100° C. | 3.306 |
| VI | 108 |
| 700° F. + Lube Yield, Wt. % | 91 |

What is claimed is:

1. A process for preparing a lubricating oil which comprises:
   (a) hydrocracking in a hydrocracking zone a hydrocarbonaceous feedstock to obtain an effluent comprising a hydrocracked oil; and
   (b) catalytically dewaxing at a temperature of from about 200° C. to 475° C., a pressure of about 200 psig to about 3000 psig, a liquid hourly space velocity of from about 0.1 hr$^{-1}$ to about 20 hr.$^{-1}$ and a hydrogen circulation rate of from about 500 to about 30,000 SCF/bbl in a catalytic dewaxing zone, the hydrocracked oil with a catalyst comprising a crystalline silicoaluminophosphate SAPO-11 and a metal selected from platinum or palladium.

2. The process of claim 1 wherein said metal is platinum.

3. The process of claim 1 wherein the hydrocracked oil to be dewaxed contains less than 50 ppm by weight nitrogen.

4. The process of claim 1 wherein the hydrocracked oil to be dewaxed contains less than 10 ppm by weight of nitrogen.

5. The process of claim 1 wherein the metal is present in the range of from 0.01% to 10% based on the weight of the molecular sieve.

6. The process of claim 1 wherein the hydrocracking step is conducted at a temperature of from 250° C. to 500° C., a pressure of about 425 psig to about 3000 psig, a liquid hourly space velocity of from about 0.1 hr.$^{-1}$ to about 50 hr.$^{-1}$, and a hydrogen circulation rate of from 400 to about 15,000 SCF/bbl. 20 hr.$^{-1}$, and a hydrogen circulation rate of from 500 to about 30,000 SCF/bbl.

7. The process of claim 1 which further includes hydrogenating the dewaxed product over a hydrogenation catalyst under hydrogenation conditions.

* * * * *